United States Patent [19]

Arnoldussen

[11] 4,277,147
[45] Jul. 7, 1981

[54] DISPLAY DEVICE HAVING REDUCED ELECTROCHROMIC FILM DISSOLUTION

[75] Inventor: Thomas C. Arnoldussen, Birmingham, Mich.

[73] Assignee: General Motors Corporation, Detroit, Mich.

[21] Appl. No.: 3,245

[22] Filed: Jan. 15, 1979

[51] Int. Cl.³ ............................................. G02F 1/17
[52] U.S. Cl. .................................................. 350/357
[58] Field of Search ........................................ 350/357

[56] References Cited

U.S. PATENT DOCUMENTS

| 3,578,843 | 5/1971 | Castellion | 350/357 |
|---|---|---|---|
| 3,840,288 | 10/1974 | Schnatterly | 350/357 |
| 3,944,333 | 3/1976 | Leibowitz | 350/357 |
| 3,957,352 | 5/1976 | Leibowitz | 350/357 |
| 3,981,560 | 9/1976 | Heyman et al. | 350/357 |
| 4,021,100 | 5/1977 | Giglia | 350/357 |
| 4,120,568 | 10/1978 | Deb et al. | 350/357 |

Primary Examiner—James W. Davie
Attorney, Agent, or Firm—George A. Grove

[57] ABSTRACT

In the preferred embodiment, an improved electrochromic display device is disclosed wherein an acid-resistant, proton-conductive, nonporous polymer layer separates the electrochromic transition metal oxide film and the aqueous acidic electrolyte. The polymer layer preferably comprises an ultraviolet light-cured, plasticized poly (vinyl alcohol) that is thermally treated to render it acid insoluble. The polymer layer conducts protons between the electrolyte and the electrochromic layer to permit the desired electrochromic reactions to occur, but reduces film dissolution into the electrolyte to substantially extend the useful lifetime of the device.

5 Claims, 1 Drawing Figure

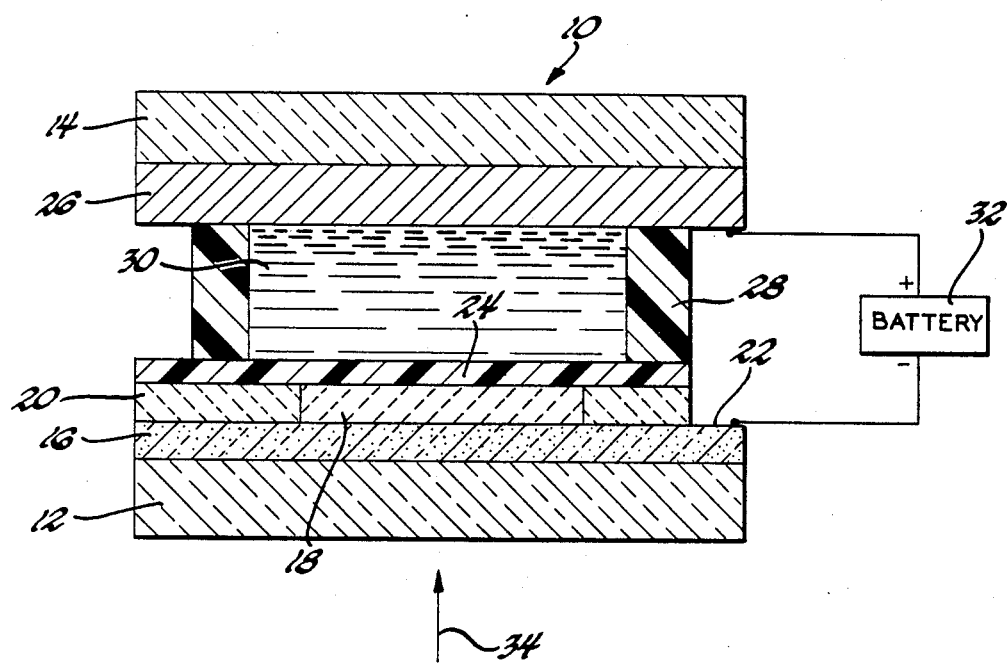

DISPLAY DEVICE HAVING REDUCED ELECTROCHROMIC FILM DISSOLUTION

BACKGROUND OF THE DISCLOSURE

This invention relates to an electrochromic display device having a selectively colorable transition metal oxide film and an acidic aqueous electrolyte, wherein the film reacts with electrolyte protons in the presence of an applied electric field to change from a transparent state to a colored state. More particularly, this invention relates to extending the useful lifetime of an electrochromic display device by minimizing the dissolution of the transition metal oxide film into the acidic aqueous electrolyte.

In a conventional electrochromic display device, the desired display is developed by applying an electric field to an electrochromic transition metal oxide film to cause the film to change its electromagnetic radiation-transmitting properties. Several suitable electrochromic transition metal oxides are known, tungsten oxide typically being preferred because it forms a highly visible display. The tungsten oxide is vapor-deposited onto a transparent tin oxide electrode, which has in turn been applied to one surface of a supporting glass plate. The deposited film is contacted with an acidic aqueous electrolyte, for example, by 10% by volume $H_2SO_4$ solution containing a white pigment. The electrolyte is in turn in contact with a suitable counterelectrode. When the transparent electrode is connected to a negative battery terminal and the counterelectrode is connected to the positive terminal, the film reacts with protons from the electrolyte to change colors in accordance with the following empirical half-reaction:

wherein the extent of reaction x is controlled by the current entering the film and determines the depth of coloration. Thus, the film changes from a transparent state to a blue state, designated tungsten bronze. When viewed through the supporting glass plate, a tungsten bronze (blue) display is seen against a contrasting white background provided by the pigmented electrolyte. The tungsten bronze state persists after the electric field is discontinued. However, by reversing the polarity of the electrodes, the reaction is reversed, the electrochromic film is bleached, and the display is erased.

A major problem encountered with conventional electrochromic display devices is that the tungsten oxide film dissolves in the aqueous electrolyte. Film dissolution occurs even as the device sits on the shelf and is substantially increased by the cyclic coloring and bleaching of the film to develop and erase the display. Thus, the device has a short shelf lifetime and an even shorter cycle lifetime. Devices employing other electrochromic transition metal oxide films also encounter problems of film dissolution into the aqueous electrolyte.

It has been proposed to reduce film dissolution by employing an electrolyte consisting of a suitable acid dissolved in an organic solvent, such as glycerine, since transition metal oxides are substantially less soluble in organic solvent than in water. However, the use of an organic-base electrolyte unacceptably increases the time required to color or bleach the film. It has also been proposed to place a porous membrane permeated with electrolyte adjacent the electrochromic film. To permit protons to flow into and out of the film to effect the desired color-changing reaction, electrolyte in the membrane pores at the film interface contacts the film. Where the electrolyte contacts the film, dissolution continues to occur, thereby reducing the device lifetime.

Therefore, it is an object of this invention to improve the shelf and cycle lifetimes of an electrochromic device having an electrochromic transition metal oxide film and an acidic aqueous electrolyte by preventing direct contact of the film and the electrolyte without significantly restricting the flow of protons therebetween. The ready flow of protons effects the desired electrochromic reactions, but the lack of film-electrolyte contact reduces film dissolution and thereby extends the useful device lifetime.

It is a further object of this invention to provide a nonporous, proton-conductive, acid-resistant polymer barrier to separate a transition metal oxide film and an aqueous acidic electrolyte in an electrochromic display device to inhibit the film from dissolving into the electrolyte. The barrier readily conducts electrolyte protons that react to color and bleach the film, but improves the useful lifetime of the device by reducing film dissolution.

SUMMARY OF THE INVENTION

In the preferred embodiment, these and other objects are accomplished by providing, in an electrochromic device, an acid-resistant, proton-conductive, nonporous polymer layer between the electrochromic tungsten oxide film and the sulfuric acid-containing aqueous electrolyte. The polymer layer is composed of a plasticized, cross-linked poly (vinyl alcohol) that has been thermally treated to render it acid insoluble. The poly (vinyl alcohol) layer is formed as a coating on the surface of the tungsten oxide film, prior to assembling the film into the device. After the electrochromic film is deposited on the electrode substrate, an aqueous solution comprising a mixture of a poly (vinyl alcohol) having a molecular weight of less than 1000, a glycerin plasticizer and an ultraviolet light-sensitive $K_2CrO_7$ curing agent is applied to the exposed film surface. After drying, the mixture is cured by exposure to ultraviolet light to cross-link the poly (vinyl alcohol) monomers. Thereafter, the polymer is heated to a temperature sufficient to render it insoluble in an aqueous solution without decomposing it. The resulting layer is transparent, colorless and substantially nonporous.

When the polymer-coated electrochromic tungsten oxide film is incorporated into a display device, the cured and thermally treated poly (vinyl alcohol) layer lies between a 10% $H_2SO_4$ electrolyte solution and the electrochromic film. The nonporous polymer layer prevents the electrolyte from directly contacting the film and is substantially impermeable to tungsten oxide-bearing anions, that form at the film and would otherwise diffuse into the electrolyte. Thus, the polymer layer of this invention effectively minimizes film dissolution into the electrolyte and thereby substantially extends the useful lifetime of the device. Also, the abundance of hydroxyl groups in the poly (vinyl alcohol) enables protons to readily flow through the layer. Because the polymer layer readily conducts protons, its presence in the subject device does not significantly affect the time required to color or bleach the electrochromic film. Therefore, the improved electrochromic display device of this invention, wherein a nonporous, acid-resistant, proton-conductive polymer layer separates the aqueous acidic electrolyte and the electrochromic transition metal oxide film, effectively prevents film dissolution into the electrolyte without significantly affecting the operation of the device to form the desired display.

DESCRIPTION OF THE DRAWINGS

The only FIGURE is a cross-sectional view of an electrochromic display device having a polymer layer that extends the useful device lifetime in accordance with this invention.

DESCRIPTION OF THE INVENTION

Referring to the FIGURE, a preferred electrochromic display device 10 of this invention is illustrated. Device 10 is a sandwich construction comprising a first generally rectangular glass plate 12 and a second generally rectangular glass plate 14 in spaced, generally parallel relationship. The inner surface of plate 12 carries a transparent Sb-doped tin oxide electrode 16 of about 0.5 micron in thickness. Tin oxide-coated glass plates are readily commercially available from the Libby Owens Ford Co. A transparent silicon dioxide insulating layer 20 was applied to electrode 16, masked with a suitably patterned photoresist mask (not shown) and plasma etched to expose electrode 16 in the desired display pattern. A 0.8 micron thick electrochromic film 18 of empirical formula $WO_3$ is vapor-deposited onto the mask and exposed portion of electrode 16. During $WO_3$ deposition, plate 12 and overlaps are preferably heated to 180° C. to improve the adhesion of the deposited film. Thereafter, the mask is dissolved, removing excess tungsten oxide except for film 18 deposited directly upon electrode 16 and re-exposing silicon dioxide layer 20. A peripheral area 22 is left uncoated to provide suitable electrical contact with the electrode 16. In accordance with this invention, an acid-resistant, proton-conductive, nonporous poly (vinyl alcohol) layer 24 is applied to the exposed surface of tungsten oxide film 18 and silicon dioxide 20.

The counterelectrode is a lead film 26 lying on the inner surface of second glass plate 14. An acid-resistant neoprene wall 28 extending between lead counterelectrode 26 and polymer layer 24 about tungsten oxide film 18 defines a liquid-tight chamber containing electrolyte paste 30. An epoxy adhesive was employed to seal wall 28 to counterelectrode 26 and polymer layer 24. Electrolyte paste 30 preferably comprises equal portions by weight of $TiO_2$ and a 10% by volume aqueous solution of $H_2SO_4$, together with a small amount of poly (vinyl alcohol) to gel the electrolyte. Typically, about 1% by weight poly (vinyl alcohol) is dissolved in the $TiO_2$-acid solution at 85° C. and the hot electrolyte paste is incorporated into the device and wherein it gels upon cooling. The $TiO_2$ provides a white background to enable the display to be more easily viewed. Electrolyte 30 thus contacts the immediate surface of polymer layer 24, but is prevented from immediate contact with electrochromic film 18. Polymer layer 24 permits electrolyte protons to pass to and from film 18, but insulating layer 20 prevents protons from contacting electrode 16.

In device 10, the desired display may be developed by directly electrically connecting counterelectrode 26 and electrode 16 (at area 22), whereupon metallic Pb is oxidized at the counterelectrode and the desired electrons flow to electrode 16. However, the display is preferably developed by connecting, through suitable leads, electrode 14 at exposed area 22 to the negative terminal of a battery 32 and counterelectrode 26 to the positive terminal. Battery 32 provides an additional 0.3 volts to the spontaneous voltage and increases the coloring time. In either case, electrons from electrode 14 and protons supplied from the electrolyte 30 through proton-conductive poly (vinyl alcohol) film 24 enter electrochromic tungsten oxide film 18 and cause the desired electrochromic reactions to occur therein. The reactions create the desired tungsten bronze display, which is viewed in the direction of arrow 34 against the contrasting white background provided by the $TiO_2$-containing electrolyte paste 30. Reversing the polarity of the electric field by connecting electrode 16 to the positive battery terminal and counterelectrode 26 to the negative battery terminal reverses the reactions within layer 18 and thereby bleaches the display. A bleaching potential of about 1.8 volts was employed.

In the preferred embodiment, acid-resistant, nonporous poly (vinyl alcohol) film 24 is applied to the tungsten oxide film 18 after film 18 has been vapor-deposited in a conventional manner onto the desired portion of electrode 16, as defined by silicon dioxide layer 20. The poly (vinyl alcohol) employed as obtained from the DuPont Company under the trade designation Elvanol 70-05. It comprises 99% hydrolysed poly (vinyl alcohol) having a molecular weight of between about 500 and 600. A solution was prepared by dissolving 1.0 g. of the poly (vinyl alcohol) and 0.1 g. $K_2Cr_2O_7$ in 20.0 ml. of water. The $K_2Cr_2O_7$ permits the poly (vinyl alcohol) to be cured by exposure to ultraviolet light. Also, about 1.0 ml. of glycerin (glycerol) was added to the solution as a plasticizer to reduce film cracking during baking. A few drops of solution were then applied to the center of the glass plate 12 surface comprising tungsten oxide film 18 and silicon dioxide film 24. Glass plate 12 and overlayers were spun at about 50 revolutions per second to cause the solution to flow and form a coating about 0.5 micron thick. Solution was swabbed from electrode peripheral area 22 to expose electrode 16 for subsequent electrical contact. The solution was then dried in air at 90° C. for five minutes.

The poly (vinyl alcohol) was thereafter cured by exposure to high intensity ultraviolet light for about 60 seconds. In the presence of $K_2Cr_2O_7$, ultraviolet light induces cross-linkage between poly (vinyl alcohol) molecules. The cross-linked polymer exhibits a reduced, but appreciable and not preferred aqueous solubility. Preferably, the cured poly (vinyl alcohol) layer was baked in air at 135° C. for about one hour, to render the poly (vinyl alcohol) layer substantially insoluble in aqueous solution. The resulting cured and thermally treated poly (vinyl alcohol) layer was transparent and very slightly yellow. Glass plate 12 carrying tungsten oxide film 18 and cured and thermally treated polymer layer 24 was thereafter incorporated into the aforementioned electrochromic display device.

The performance of an improved display device having the acid-resistant, proton-conductive, nonporous polymer layer intermediate the tungsten oxide film and the PVA-gelled electrolyte was compared with a similar conventional device. The conventional device featured a tungsten oxide film in direct contact with an ungelled electrolyte paste comprising $TiO_2$ and a 10% $H_2SO_4$ solution. Concerning the shelf lifetime, the tungsten oxide film in the conventional device dissolved in the electrolyte within about two days. In constrast, the improved device having the protective polymer film of this invention exhibited a shelf life of over one month.

In the conventional device, the display was developed by a direct electrical connection between the lead counterelectrode and the transparent electrode and was bleached using a potential of 1.5 volts. To maintain the same current through the film, the display in the device having the polymer layer was developed with an additional voltage of 0.3 volts and was bleached with a voltage of 1.8 volts. The increased voltage compensated for the slight increase in the internal resistance due to the polymer layer. The polymer layer resistance was calculated to be less than $10^6$ ohm cm, corresponding to a proton conductivity of greater than $10^{-6}$ Siemann per cm. Under these conditions, the conventional device sustained less than 1,000 cycles (alternate film coloring and bleaching). In marked contrast, the improved device of this invention sustained between 6,000 and 10,000 cycles.

The visual display-forming properties of the conventional and improved devices were determined to be substantially comparable. Further tests demonstrated no significant difference in electrochromic devices having polymer layers when an ungelled electrolyte was substituted for the preferred gelled electrolyte.

For simplicity of illustration, electrode 16 is illustrated as covering the entire surface of glass plate 12 and only a single tungsten oxide film 18 is shown. However, it is well-known to employ in device 10 a plurality of discrete electrodes 16 segments on discrete tungsten oxide film 18 segments and to shape and arrange the segments to form a desired display pattern. For example, seven generally rectangular tungsten film segments are conventionally arranged in a FIG.-8 design, each segment lying upon a separate electrode segment and being selectively colorable to display a desired numeric digit. In devices employing a plurality of film 18 segments, each segment is preferably coated by the protective polymer layer.

It is believed that ultraviolet light curing of a poly (vinyl alcohol) solution causes hydroxyl groups on neighboring molecules to form cross-linking ether bonds. The cross-linking reactions involve only a small proportion of the available hydroxyl groups and the resulting polymer contains a substantial number of unreacted hydroxyl groups. Proton transfer between hydroxyl groups enables protons to be conducted through the polymer, particularly in response to an applied electric field. Although the cured poly (vinyl alcohol) layer readily conducts protons to effect the desired reactions, it inhibits water from contacting the tungsten oxide and reacting to form water soluble tungsten oxide anions, such as tungstate $WO_4^{-2}$ or pseudometatungstate $HW_6O_{20}^{-3}$. Furthermore, the nonporous layer is substantially impermeable to any tungsten oxide anions that do form and particularly to the larger polyanions whose formation is favored where a vapor-deposited tungsten oxide film is employed.

In the preferred embodiment, the commercially available poly (vinyl alcohol) was of the type frequently employed as a photoresist mask in semiconductor manufacture. In general, poly (vinyl alcohol) having high molecular weights and a high degree of hydrolysis are preferred to form cured polymer layers which are difficultly soluble in an acidic aqueous solution. Glycerin was preferbly added to the poly (vinyl alcohol) as a plasticizer. In the absence of the plasticizer, the cured poly (vinyl alcohol) layer occasionally cracked during backing and exposed the underlying film. Other suitable plasticizers for forming crack-resistant poly (vinyl alcohol) coatings include glycols, such as ethylene glycol, lower polyethylene glycols and butanediols. It is also within the skill of the art to incorporate other known additives into the poly (vinyl alcohol) layer, particularly additives which promote proton-conduction or reduce water solubility.

In the preferred embodiment, the poly (vinyl alcohol) coating was applied to both the tungsten oxide film and the silicon dioxide insulating film. While not detrimental to display-forming operations, it is believed that the portion of the cured layer overlying the silicon dioxide film serves no useful purpose. Thus, the poly (vinyl alcohol) solution may be suitably removed from the silicon dioxide layer prior to curing. Alternately, the solution may be selectively cured to coat only the tungsten oxide layer. In accordance with conventional photoresist mask-forming technology, after the solution is applied to the entire surface, the solution overlying areas where the layer is desired is selectively exposed to ultraviolet light and the remaining, uncured solution is thereafter washed away. In an embodiment wherein the polymer layer is selectively cured, it is preferred that the polymer layer extend for a short distance onto the insulating film about the periphery of the electrochromic film to prevent the electrolyte from seeping underneath the polymer layer and thereby eroding the electrochromic film.

After ultraviolet light curing, the poly (vinyl alchol) is slightly, but appreciably soluble in an aqueous acidic solution. The layer was rendered substantially acid insoluble by heating it in air. Although it is not certain what effect heating has upon the polymer structure, it is believed that the bake temperature should be at least 100° C. to promote drying of polymer and should not exceed about 170° C. to prevent polymer decomposition. Preferably, the polymer is heated to a temperature between about 130°-150° C. for a time sufficient to render it insoluble in an aqueous acid solution, without discoloration.

While in the preferred embodiment, a preferred electrochromic device is presented wherein a tungsten oxide film was protected by a nonporous, acid-resistant, proton-conductive polymer layer, it is apparent that the subject layer may be advantageously incorporated into aqueous electrolyte-containing electrochromic display devices of different design. Also, the useful lifetime of devices comprising electrochromic films consisting of transition metal oxides other than tungsten oxide may be advantageously extended by the polymer layer of this inventon. For example, it is known that oxides of chromium, molybdenum, vanadium, and manganese are electrochromic. That is, in the presence of electrolyte protons and an applied electrical current, these transition metal oxides react to form a product having different electromagnetic radiation transmitting properties. The use of these transition metal oxides in an electrochromic diaplay device has been particularly inhibited by their ready aqueous solubility. Thus, it is particularly advantageous to employ the polymer layer to protect these transition metal oxides and thus form a suitable electrochromic display device.

While this invention has been described in terms of certain specific embodiments thereof, it will be appreciated that other forms can readily be adapted by those skilled in the art and, accordingly, the scope of this invention is to be considered limited only by the following claims.

The embodiments of the invention in which an exclusive property or privilege is claimed are defined as follows:

1. An electrochromic device having an electrochromic transition metal oxide film whose electromagnetic radiation transmitting properties are alterable in response to an electric field, said device comprising
   a supported transparent electrode,
   an electrochromic transition metal oxide film in electrical contact with said electrode,
   a proton-conductive, acid-resistant, nonporous polyhydroxyl polymer layer applied to said electrochromic film,
   an acidic aqueous electrolyte in contact with said polymer layer and
   a suitable counterelectrode in contact with said electrolyte.

2. An electrochromic device having an electrochromic transition metal oxide film whose electromagnetic radiation transmitting properties are alterable in response to an electric field, said device comprising
   a glass support;
   a transparent electrode on a surface of said support;
   an electrochromic transition metal oxide film applied to said electrode,
   a nonporous, proton-conductive, acid-insoluble, cured poly (vinyl alcohol) layer applied to said electrochromic film,
   an acidic aqueous electrolyte in contact with said poly (vinyl alcohol) layer but separated from said electrochromic film by said layer, and
   a suitable counterelectrode in contact with said electrolyte.

3. An electrochromic device wherein an electrochromic transition metal oxide film is selectively colorable in response to an electric field, said device comprising
   a glass support;
   a transparent electrode on a surface of said support;
   an electrochromic transition metal oxide film overlying said electrode,
   an ultraviolet light-cured and thermally-treated, nonporous plasticized poly (vinyl alcohol) layer overlying said electrochromic film,
   an acidic aqueous electrolyte in contact with said poly (vinyl alcohol) layer, said layer thereby separating the electrochromic film from the electrolyte, but permitting proton transfer therebetween,
   a suitable counterelectrode in contact with said electrolyte.

4. An electrochromic device wherein an electrochromic film is selectively colorable in response to an electric field, said device comprising
   a glass support;
   a transparent tin oxide electrode on a surface of said support;
   an electrochromic film deposited onto said electrode, said film comprising an electrochromic metal oxide formed of a metal selected from the group consisting of manganese, chromium, vanadium, tungsten and molybdenum,
   a proton-conductive, acid-insoluble, nonporous poly (vinyl alcohol) layer applied to said electrochromic film, said layer being formed by applying to said film a mixture comprising poly (vinyl alcohol), an ultraviolet light-sensitive curing agent and a plasticizer; exposing said mixture to ultraviolet light to cure the poly (vinyl alcohol) and heating the cured poly (vinyl alcohol) to a temperature and for a time sufficient to minimize the solubility of the layer in an acidic aqueous electrolyte solution,
   an acidic aqueous electrolyte in contact with said poly (vinyl alcohol) layer, but separated from said electrochromic film by said poly (vinyl alcohol) layer, and
   a suitable counterelectrode in contact with said electrolyte.

5. An electrochromic device wherein an electrochromic film is selectively colorable in response to an electric field, said device comprising
   a glass support;
   a transparent tin oxide electrode on a surface of said support;
   an electrochromic tungsten oxide film vapor-deposited onto said electrode,
   a proton-conductive, acid-insoluble, nonporous poly (vinyl alcohol) layer covering said electrochromic film, said layer being formed by applying to said film aqueous solution comprising a mixture of poly (vinyl alcohol), $K_2CrO_7$ and glycerin, at least partially drying the solution, exposing said mixture to ultraviolet light to cure the poly (vinyl alcohol) and heating the cured poly (vinyl alcohol) to a temperature of between 130° to 150° C. for a time sufficient to minimize the solubility of the layer in an aqueous $H_2SO_4$ solution,
   an electrolyte comprising an aqueous $H_2SO_4$ solution, said electrolyte contacting with said poly (vinyl alcohol) layer, but separated from said electrochromic film by said poly (vinyl alcohol) layer, and
   a suitable counterelectrode in contact with said electrolyte.

* * * * *